(12) United States Patent
Merscher et al.

(10) Patent No.: US 10,837,576 B2
(45) Date of Patent: Nov. 17, 2020

(54) GLOBE VALVE AND ARRANGEMENT FOR A GLOBE VALVE

(71) Applicant: SAMSON AKTIENGESELLSCHAFT, Frankfurt (DE)

(72) Inventors: Michael Merscher, Roedermark (DE); Andreas Sander, Laudenbach (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 102 days.

(21) Appl. No.: 16/154,993

(22) Filed: Oct. 9, 2018

(65) Prior Publication Data
US 2019/0107221 A1   Apr. 11, 2019

(30) Foreign Application Priority Data
Oct. 9, 2017   (DE) .......................... 10 2017 123 396

(51) Int. Cl.
*F16K 1/42*   (2006.01)
*F16K 3/22*   (2006.01)
(Continued)

(52) U.S. Cl.
CPC .............. *F16K 31/163* (2013.01); *F16K 1/42* (2013.01); *F16K 1/427* (2013.01); *F16K 3/246* (2013.01);
(Continued)

(58) Field of Classification Search
CPC .......... F16K 31/163; F16K 1/42; F16K 1/427; F16K 3/246; F16K 3/262; F16K 3/267;
(Continued)

(56) References Cited

U.S. PATENT DOCUMENTS 2,510,442 A   6/1950   Volpin
4,834,133 A *  5/1989   LaCoste .................. F16K 3/246
                                                    137/315.11
(Continued)

FOREIGN PATENT DOCUMENTS

DE           3834173 A1   4/1990
DE    202016105250 U1    12/2016
(Continued)

*Primary Examiner* — Kelsey E Cary
(74) *Attorney, Agent, or Firm* — Schiff Hardin LLP

(57) ABSTRACT

An arrangement for a globe valve for adjusting a process fluid can include a valve housing having an inlet and an outlet connected by a passage, a valve cage to linearly guide a valve member of the globe valve in an axial direction, and a position lock (securing device). The valve cage can include a passage channel(s) extending transversely in the axial direction. The valve cage can be arranged in the valve housing where: the valve cage circumferentially surrounds the passage opening with respect to the axial direction, and a radial outer side of the valve cage with respect to the axial direction is in contact with a radial inner side of the valve housing with respect to the axial direction. The position lock fixes a relative position of the valve cage relative to the valve housing and arranged on the radial outer side and/or on the radial inner side.

17 Claims, 2 Drawing Sheets

Figure 1:
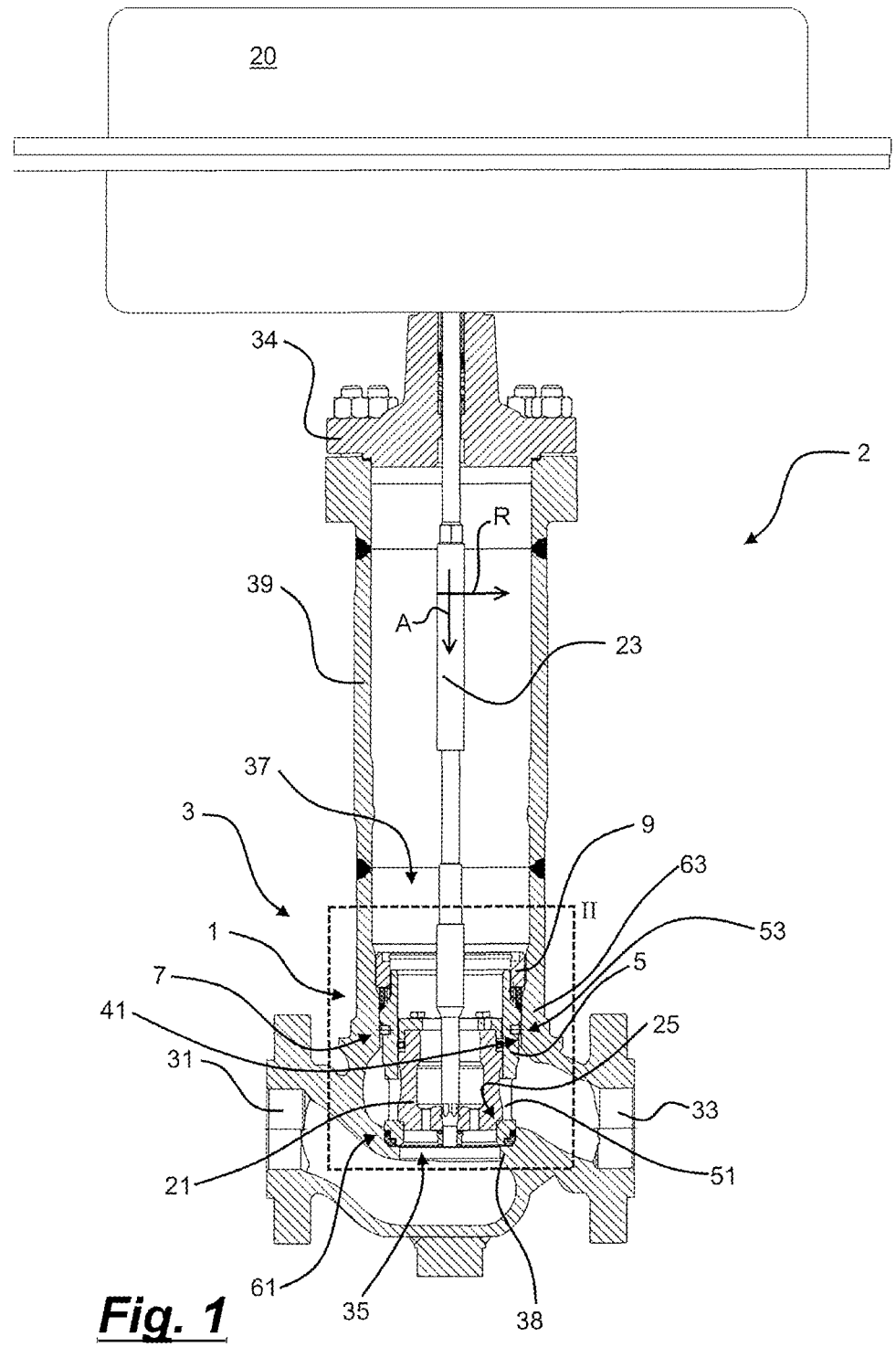

(51) Int. Cl.
*F16K 31/163* (2006.01)
*F16K 3/24* (2006.01)
*F16K 3/26* (2006.01)
*F16J 15/3268* (2016.01)
*F16K 25/00* (2006.01)

(52) U.S. Cl.
CPC ............ *F16K 3/262* (2013.01); *F16J 15/3268* (2013.01); *F16K 25/005* (2013.01)

(58) Field of Classification Search
CPC ........ F16K 25/005; F16K 1/422; F16K 1/465; F16K 5/184
USPC .................................................. 251/324, 325
See application file for complete search history.

(56) References Cited

U.S. PATENT DOCUMENTS

| | | | |
|---|---|---|---|
| 6,953,162 B2 | 10/2005 | Hans | |
| 7,854,239 B2* | 12/2010 | Wears | F16K 11/044 137/625.4 |
| 2010/0140518 A1* | 6/2010 | Billings | F16K 3/24 251/129.01 |
| 2010/0307610 A1* | 12/2010 | Wears | F16K 3/246 137/454.6 |
| 2011/0291034 A1* | 12/2011 | Bunge | F16K 31/124 251/12 |
| 2013/0193356 A1* | 8/2013 | Collison | F16K 3/26 251/89 |
| 2013/0320252 A1 | 12/2013 | Hageman et al. | |
| 2014/0264135 A1* | 9/2014 | Bell | F16K 1/42 251/359 |
| 2016/0123492 A1 | 5/2016 | Tibben et al. | |
| 2017/0184219 A1* | 6/2017 | Braeuer | F16K 47/08 |
| 2019/0024803 A1* | 1/2019 | Sander | F16K 47/08 |

FOREIGN PATENT DOCUMENTS

| | | |
|---|---|---|
| DE | 102015011551 B3 | 3/2017 |
| EP | 1364118 B1 | 2/2008 |

\* cited by examiner

GLOBE VALVE AND ARRANGEMENT FOR A GLOBE VALVE

CROSS REFERENCE TO RELATED APPLICATIONS

This patent application claims priority to German Patent Application No. 10 2017 123 396.2, filed Oct. 9, 2017, which is incorporated herein by reference in its entirety.

BACKGROUND

The disclosure relates to a globe valve for adjusting a process fluid of a technical process plant, such as a chemical plant, such as a petrochemical plant, a food processing plant, such as a brewery, a power plant, such as a nuclear power plant, or the like. The disclosure also relates to an arrangement for a globe valve.

From the state of the art, DE 10 2015 011 551 B3, for example, control valve or globe valve for controlling the fluid flow of a technical process plant is known. The control valve comprises a control valve housing having a fluid inlet and a fluid outlet and a fluid passageway disposed there between. A support rib of the control valve housing carries a valve seat which completely surrounds the fluid passage. At the valve seat, a valve cage is attached. The control valve housing comprises a control valve housing extension which extends away from the region of the fluid passage and at the distal end has a cover mounting flange securing a housing cover in a releasable manner. If the housing cover is removed, an operator can easily access the interior of the control valve housing. In the control valve housing, a valve seat body, a valve cage and a valve cage extension are arranged as a mounting unit. The mounting unit can be removed with the housing cover open. The valve cage extension is dimensioned so that it extends well beyond an actuator access flange from which the control valve housing extension extends. The valve cage extension is screwed to the valve cage. The mounting unit of valve seat, valve cage and valve cage extension is clamped between the support rib and the housing cover of the control valve housing.

The known globe valve has proven itself in particular for controlling cryogenic media and enjoys great popularity. However, in some applications there is a desire to use an asymmetrically designed valve cage or the desire of a specific orientation of the valve cage openings. However, when inserting the mounting unit through the valve housing extension, the installer has no view on the orientation of the valve cage in the valve housing. If the control valve is mounted in a plant, thus the fluid inlet and outlet are occupied with pipes, it is not easy for the installer to check after installation of the mounting unit whether it is inserted in the correct orientation.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 3:
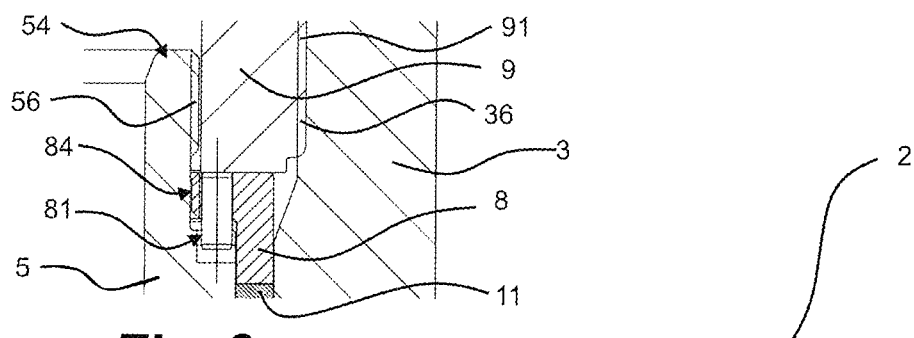
Figure 2:
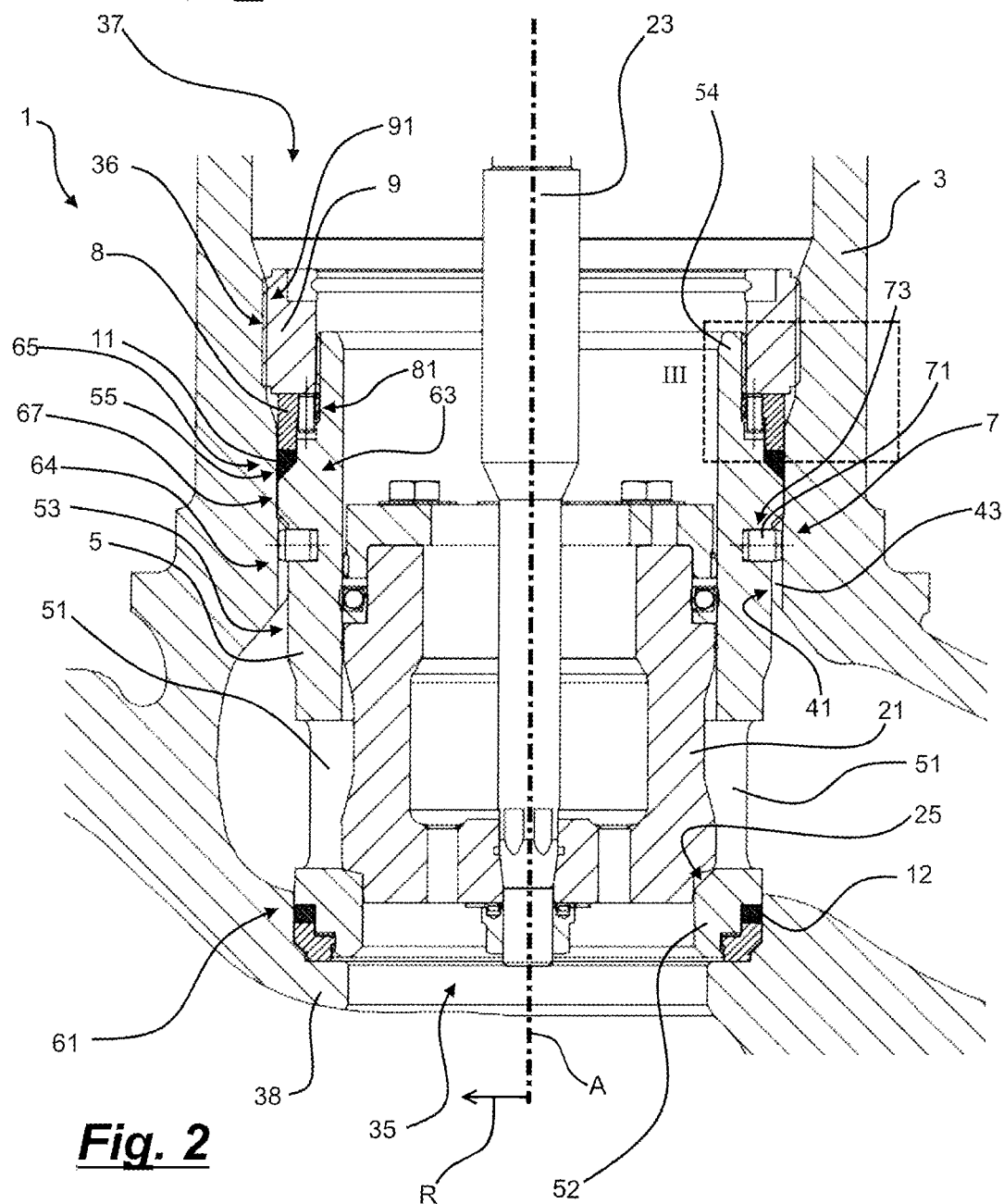

FIG. 1 a cross-sectional view of a globe valve with an arrangement according to an exemplary embodiment of the present disclosure;

FIG. 2 a detailed view of the arrangement according to an exemplary embodiment and according to section II of FIG. 1; and FIG. 3 a detailed view of the front side contact region of the arrangement according to an exemplary embodiment and according to section III of FIG. 2.

The exemplary embodiments of the present disclosure will be described with reference to the accompanying drawings. In the drawings, the same or similar reference signs are used for identical or similar components.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to provide a globe valve and an arrangement for a globe valve for adjusting a process fluid, such as a cryogenic process fluid, in which a predetermined mounting position is ensured simply and without damage to the globe valve, in particular a sealing, even for inexperienced assembly personnel.

Accordingly, an arrangement for a globe valve for providing a process fluid, such as a cryogenic process fluid, a technical process plant, such as a chemical plant, such as a petrochemical plant, a food processing plant, such as a brewery, a power plant, such as a nuclear power plant, or the like is provided. A globe valve is generally characterized in that a valve member for adjusting the process fluid relative to a valve seat performs a linear or translational stroke movement. A globe valve may be designed, for example, as an open/close valve.

In an exemplary embodiment, the arrangement includes a valve housing having an inlet and an outlet for the process fluid, wherein the valve housing has a passage opening arranged between the inlet and the outlet. When the globe valve is open, the process fluid can flow from the inlet through the passage opening to the outlet of the valve housing in accordance with the operation. Furthermore, in an exemplary embodiment, the arrangement includes a sleeve-shaped valve cage (e.g. a cylindrical sleeve-shaped valve cage) for linearly guiding a valve member, such as a reciprocating piston, of the globe valve in an axial direction, wherein the valve cage comprises at least one passage channel for the process fluid which extends transversely in the axial direction. In an exemplary embodiment, in an open state of the globe valve, the process fluid flows from the inlet of the valve housing through its passage opening and through the passage channel of the valve cage to the outlet of the valve housing. In an exemplary embodiment, other flow paths from the valve inlet to the valve outlet for the process fluid are not provided. The valve member, for example the reciprocating piston, can be dimensioned in the radial direction, preferably in full circumference and/or in the axial direction along its entire height, substantially complementary to the shape of the valve cage. At least one sealing, for example a sealing ring, can be provided on an outer circumference of the reciprocating piston, which provides a sealing between the outer circumference of the valve member and the inner circumference of the valve cage.

In an exemplary embodiment, the valve cage is arranged in the valve housing such that the valve cage circumferentially surrounds the passage opening with respect to the axial direction, and that a radial outer side of the valve cage with respect to the axial direction is in contact with a radial inner side of the valve housing with respect to the axial direction. In an exemplary embodiment, the valve cage may have a foot-side annular shaped contact section with respect to the valve housing in the region of the valve seat. For this purpose, the valve housing may, for example, comprise an inwardly projecting rib in the radial direction with respect to the axial direction, on which the valve cage and/or the valve seat are supported in the axial direction. Such a support rib can define the circumference of the passage opening. In the region of an axial support of the valve cage to the valve housing and/or a valve seat, an annular sealing may be provided to ensure that in a closed position of the valve member with respect to the valve seat no fluid can flow along the contact surfaces of the valve cage and/or the valve seat to the valve housing from the inlet to the outlet of the valve housing. A second face contact and/or sealing portion may be provided in an end of the valve cage remote from the valve seat in the axial direction where the valve cage may be in circumferential annular contact with the valve housing. According to an exemplary embodiment of a valve member as a reciprocating piston, which is guided in a valve cage, the reciprocating piston can have a passage in axial direction, so that a separation in the closed state of the adjusting member takes place from the fluid region within the valve member (and the valve cage) and, for example, upstream of the valve seat and a second region, for example, downstream of the valve seat and outside the adjusting member (and the valve cage). Such a design of a valve member is particularly advantageous for high pressure differences, so that the axial stroke movement can take place regardless of a possibly high pressure gradient, in particular in the closed state. In an exemplary embodiment, the inside of the valve housing and the outside of the valve cage can be formed in a substantially circular manner, in particular in the contact region or in the contact regions. In particular, one or more annular sealings can be arranged in the contact region or in the contact regions of the inner side of the valve housing and the outer side of the valve cage. Annular sealings in the contact regions between the radial outer side of the valve cage and the radial inner side of the valve housing can serve in particular for sealing between upstream high pressure and downstream low pressure region.

In an exemplary embodiment, a securing device configured to fix a relative position of the valve cage relative to the valve housing is arranged on the outer side of the valve cage and/or on the inner side of the valve housing. In particular, the securing device configured to fix the relative position of the valve cage with respect to the valve housing may be provided in a region, such as a front side contact region, of the valve cage which is arranged axially spaced from the valve seat and/or which is arranged opposite to the valve seat with respect to the at least one passage channel of the valve cage. The region of the valve cage near the valve seat and/or with the valve seat may be referred to as a valve cage-foot section. The region of the valve cage which is remote from the valve seat may be referred to as a valve cage-front section. The valve cage-foot section may in particular be arranged in the region of the passage opening and/or be arranged at a support rib of the control valve housing. The valve cage-front section is preferably arranged in a mounted state in a control-passage-region of the valve housing in which an adjusting member of the globe valve connected to the valve member projects into or through the valve housing to actuate the valve member.

The use of a securing device to establish a relative position to the valve cage and the valve housing allows to ensure that during mounting of the valve cage in the valve housing a predetermined relative position of the valve cage to the valve housing is respected. Preferably, the securing device can comprise rotationally-asymmetrical components for the clear determination of the mounting end position. The design of the securing device on the outer side of the valve cage and/or on the inner side of the valve housing ensures faultless installation, even by untrained installation personnel.

In an exemplary embodiment, the securing device is realized as a position lock configured to prevent movement of the valve cage relative to the valve housing. In an exemplary embodiment, the securing device is a rotation lock configured to prevent rotational movement of the valve cage relative to the valve housing. In an exemplary embodiment, the rotation lock includes a form-fit connection relative to the axial direction in the circumferential direction. The provision of a form-fit locking connection in the circumferential direction of the valve cage outer side to the valve housing inner side in the, in particular front side contact region, ensures that no torsional shifts between the valve cage and the valve housing occur, in particular in the front side contact area, so that a sealing arranged between the valve cage and the valve housing, in particular at the front side contact area, is not exposed to any torsional load.

In an exemplary embodiment, the securing device, preferably the rotation lock comprises at least one radial projection and/or recess on the outer side of the valve cage and at least one shape complementary radial recess and/or projection on the inner side of the valve housing. This embodiment may be combined with one or more other embodiments, such as the embodiment of the rotation lock with the form-fit connection discussed above. It may be preferred that a plurality of, for example two or three, radial projections (or recesses) are provided on the valve cage outer side, but the number is not limited hereto. In an exemplary embodiment, the at least two radial projections and/or recesses are arranged rotationally asymmetric relative to the axial direction. It may be preferred that several radial recesses (or projections), for example two or three, are provided on the radial inner side of the valve housing. In an exemplary embodiment, the valve cage has at least one radial projection. In particular, all radial projections on the valve cage and radial recesses may all be provided on the valve housing. The number of recesses is at least as large as the number of projections for realizing the rotation lock. It is conceivable that the valve housing comprises at least one radial projection and at least one radial recess and the valve cage comprises in a shape complementary manner at least one radial recess and at least one radial projection. Such a combination or connection of at least two projections and/or recesses may be advantageous for precise setting of a predetermined mounting position.

According to an exemplary embodiment of the arrangement, at least one radial projection can be formed in one piece by material of the valve cage or of the valve housing. Additionally or alternatively, at least one radial projection may be formed by a connecting body, such as a pin, a wedge or the like. Depending on the tolerance requirements for the contact region, a one-piece or multi-piece design may be more cost-effective to manufacture for the required precision.

According to an exemplary embodiment of the arrangement that can be combined with the previous one (and/or other embodiments/arrangements), at least one radial recess comprises a recess, such as a blind borehole, preferably for holding a connecting body, in particular a pin. Alternatively, in an exemplary embodiment, the at least one radial recess may comprise a groove extending in the axial direction such as a longitudinal groove. The recess may have a purely radial main extension. A recess, for example, a blind borehole, may have a rotationally symmetrical cross section relative to the radial main extension. A recess formed as a groove, in particular as a longitudinal groove, has a longitudinal extent extending in the axial direction and a groove depth extending transversely to the axial direction in the radial direction. The cross-sectional width and/or the radial groove depth may be constant along the axial longitudinal extent of the longitudinal groove.

According to an exemplary embodiment of an arrangement according to the disclosure, which can be combined with one or more of the previous embodiments, the valve housing has an internal thread. According to this embodiment, the assembly further comprises a fastening nut which is configured with an external thread for screwing the fastening nut into the internal thread of the valve housing. In an exemplary embodiment, the valve cage is clampable in axial direction between the fastening nut and an annular section, for example a rib, surrounding the passage opening of the valve housing. For example, the fastening nut may be in contact with a first axial end of the valve cage, such as a front end, and the annular section surrounding the passage opening may be in contact with a second axial end of the valve cage, such as a foot end. By screwing the fastening nuts into the valve housing, a clamping force can be exerted on the valve cage to bias the valve cage in the axial direction against the annular section surrounding the passage opening. In the region of the annular section, there may be indirect contact with the foot end of the valve cage. Alternatively, in an exemplary embodiment, an intermediate element, such as a washer, or a valve seat which is separate from the valve cage may be arranged between the annular section of the valve housing and the valve cage. The fastening nut firmly secures the valve cage in the mounted state axially fixed to the valve body.

In an exemplary embodiment, the arrangement further comprises an intermediate sleeve which is arranged between the fastening nut and the valve cage such that the axial clamping force with which the valve cage is held between the annular section and the fastening nut is preferably transmitted completely indirectly from the fastening nut through the intermediate sleeve to the valve cage. It is conceivable that two or more intermediate sleeves are provided. Such an intermediate sleeve between the fastening nut and the valve cage may be provided in the manner of a washer for setting predetermined pretension states and/or for reducing the transmission of torsional forces from the fastening nut to the valve cage.

In an exemplary embodiment, an arrangement further comprises a sealing which is arranged radially between the valve cage and the valve housing. In particular, the sealing can be received in particular in a sealing receiver which is delimited in the axial direction by the intermediate sleeve and by the valve cage. For example, the seal may be an annular sealing, in particular with a quadrangular cross-section, for example square or parallelogram type cross section. Such a quadrangular-shaped sealing may have two side areas which are in contact with the valve cage and as well one area each which is in contact with the valve body and the intermediate sleeve. It is preferred that the axial section in which the securing device is arranged relative to the axial section in which the sealing is arranged, is offset at least partially radial and/or axially. In an exemplary embodiment, the inner side of the valve housing and/or the outer side of the valve cage each have a sealing surface and a respective securing surface, wherein the sealing surface and the securing surface are preferably completely different from each other. In an exemplary embodiment, a distance can be provided between the securing surface and the sealing surface in the axial direction. For example, a guide section may be provided between the securing surface and the sealing surface, in which the outer side of the valve cage forms an annular outer guide surface and/or in which the inner side of the valve cage forms an annular inner guide surface. With such a guide section, which provides a proper separation in the axial direction between the securing device and a sealing clampable by an intermediate sleeve, it can be ensured in particular that the sealing effect of the sealing is unaffected by projections and/or recesses of the securing device.

According to an exemplary embodiment of the arrangement, which can be combined with one or more of the previous embodiments, the intermediate sleeve is held with a linear guide relative to the valve housing and/or relative to the valve cage, which permits a translational relative movement in the axial direction and prevents a rotational relative movement. In this development, the transmission of torsion from a screw-in fastening nut onto the valve cage, and in particular an annular sealing provided thereon, can be largely or even completely avoided.

The disclosure also relates to a globe valve for adjusting a process fluid of a technical process plant, such as a chemical plant, a food processing plant, a power plant or the like, comprising an arrangement as described above, and a valve member, such as a reciprocating piston, which is linearly movably guided in the valve cage, an actuating means connected to the valve member, such as a actuating rod for actuating the valve member, and in particular a housing cover with an actuating opening for the actuating means. In an exemplary embodiment, the globe valve is configured so that in the axial direction, a distance between the (upper) front end of the valve cage and the (lower) inner side of the housing cover is provided. In an exemplary embodiment, a distance is provided between the inner side of the housing cover and the (upper) actuating end of the mounting nut. In particular, the globe valve is designed so that the housing cover is free of axial contact relative to the valve cage and/or the fastening nut. In an exemplary embodiment, the axial height of the intermediate sleeve is preferably smaller than the axial height of the fastening nut and the valve cage. In an exemplary embodiment, the axial height of the mounting nut is preferably smaller than the axial height of the valve cage. The axial distance between the housing cover and the valve cage and optionally the fastening nut is preferably greater than the axial height of the valve cage.

An arrangement according to an exemplary embodiment of the disclosure will be generally referred to hereinafter by the reference numeral 1 and a globe valve equipped with the arrangement 1 according to the disclosure will have the reference numeral 2. In an exemplary embodiment, the arrangement 1 includes a valve housing 3 and a sleeve-shaped valve cage 5.

In an exemplary embodiment, the globe valve 2 illustrated in FIG. 1 includes a valve housing 3, an actuating drive 20, a valve cage 5 arranged in the valve housing 3, a reciprocating piston 21 guided linearly in the valve cage, which realizes an adjusting member, and an actuating member in the form of the actuating rod 23 which transmits the actuating force from the actuating drive 20 to the reciprocating piston 21.

As shown in FIG. 1, the valve body 3 has an inlet 31 for process fluid on the left hand side and an outlet 33 for process fluid on the right hand side. Between the inlet 31 and the outlet 33, the valve housing 3 provides a closable passage opening 35 through which the process fluid must flow from the inlet 31 to the outlet 33.

In the upper part of FIG. 2 of the valve housing 3, the valve housing comprises an actuating opening 37 through which the actuating rod 23 projects from the actuating drive to the reciprocating piston 21 and the actuating opening 37 is surrounded by a collar of the valve housing 3 to which a tubular type valve housing extension 39 is attached in the axial direction (e.g., welded) as shown in FIG. 1. The valve housing extension 39 is closed in an upper area by a valve housing cover 34. The actuating rod 23 penetrates this valve housing cover 34, wherein a sealing is provided between the actuating rod 23 and the housing cover 34 in order to separate the environment and the interior of the globe valve 2 from each other. The purpose of the valve housing extension 39 is to provide a predetermined minimum distance between the passage opening 35 of the valve housing 3 and the cover, to ensure, for example, that a sufficient distance is provided between the actuating drive 20 which is operated normally at ambient temperature and the cryogenic process fluid in the region of the passage opening 35 when using cryogenic process fluids.

In the valve housing 3 of the globe valve 2, the valve cage 5 is arranged. The valve cage 5 is in contact with the valve housing 3 in a lower, foot-side contact region 61 and in an upper, front-side contact region 63. In an exemplary embodiment, as shown in FIG. 2, in both contact regions 61 and 63 there is a circumferential annular contact surface between the outer side 53 of the valve cage 5 and the inner side 41 of the valve housing 3.

In an exemplary embodiment, in the annular, foot-side contact region 61, an annular sealing 12, which is arranged between the valve cage 5 and the valve housing 3, ensures in the closed position of the globe valve 2 (in the case of a contact between the reciprocating piston 21 and the valve seat 25) that no process fluid from the inlet 31 can reach the outlet 33 through the foot-side contact region 61.

In the front-side contact region 63, an annular groove-like sealing receiver 55 is provided on the valve cage 5, in which a (second) annular sealing 11 is arranged which realizes a sealing between the valve cage 5 and the valve housing 3 in the front section 54 of the valve cage 5. In the illustrated embodiment of a globe valve 2, the reciprocating piston 21 is realized like a sleeve with an axial passage for the process fluid. Due to the axial passage through the reciprocating piston 21, in a closed position of the globe valve 2 as shown in FIG. 2, process fluid can enter the front region 54 of the valve cage 5 or the front contact region 63 between valve cage 5 and valve housing 3. The annular sealing 11 in the front side contact region 63 therefore ensures that internal leakage in the globe valve 2 is excluded when the reciprocating piston 21 is in the closed position. The arrangement and configuration of the sealing 11 in the front-side contact region 63 will be discussed in detail below.

In an exemplary embodiment as shown in FIG. 2, the valve seat 25 is formed in one piece with the valve cage 5 at the foot side 52 or foot region of the valve cage 5. Alternatively, it is conceivable that the valve seat is provided by a separate component in relation to the valve cage 5. A valve seat which is separate from the valve cage 5 could for example be realized in an annular shape with a radially inner conical sealing surface and be arranged in the axial direction A between the valve cage 5 and the radial rib or the annular section 38 of the valve housing 3 (not shown in detail).

When the reciprocating piston 21 is moved in axial direction A (upwards) from the closed position shown in FIG. 2, the globe valve 2 provides an increasingly enlargeable flow cross-section for the process fluid (not shown in greater detail). When the lift valve 2 is open, the process fluid can flow into the interior of the sleeve-shaped valve cage 5 from the inlet 31 through the passage opening 35 which is completely surrounded by the annular section 38 of the valve housing 3. From the interior of the valve cage 5, the process fluid can flow from the inlet 31 through the passage channels 51 in a radially outward direction into an outer area radially surrounding the valve cage 5. After the process fluid has flowed from the inlet 31 through the passage opening 35 of the valve housing 3 and through a passage channel 51 of the valve cage 5, it can continue to flow freely to the outlet 33 or output.

In an exemplary embodiment, with respect to the axial direction A, the actuating rod 23, the reciprocating piston 21, the valve cage 5, the valve housing inner side 41 and/or, for example, the tubular type valve housing extension can be arranged and/or shaped substantially rotationally symmetrically. The section of the valve housing 3, which surrounds the actuating opening 37, the valve cage, the reciprocating piston 21 and/or the actuating rod 23 are arranged coaxially relative to one another with respect to the axial direction A. The axial direction A corresponds to the actuation direction realizable by the actuating drive 20.

In an exemplary embodiment, the valve cage arrangement (or in short arrangement) 1 includes the valve cage 5 which is arranged stationary in the axial direction A and in the circumferential direction about the axial direction at a predetermined mounting position in the valve housing 3. In the axial direction A, the valve cage 5 is held at the front side by the fastening nut 9 and is held at the foot side by the radial rib-like annular section 38 of the valve housing 3. The fastening nut 9 comprises an external thread 91 which engages with an internal thread 36 on the inner side 41 of the valve housing 3. Depending on the depth of engagement of the fastening nut 9 into the valve housing 3, the holding force or the pressing force with which the valve cage 5 is held or clamped by the fastening nut 9 against the annular section 38 can be adjusted.

In an exemplary embodiment, the fastening nut 9 is a substantially hollow cylindrical body with an outer diameter sectionally adapted for a threaded pairing with the inner diameter of the valve housing 3 and the widest possible fastening nut inner diameter. The axial height of the fixing nut 9 in the embodiment shown in FIG. 2 is considerably smaller than the outer diameter of the fastening nut 9, in particular smaller than the outer radius of the fastening nut 9, for example between 0.1 and 0.3 times as high as the outer diameter of the fastening nut 9. The upper, drive-side end of the fastening nut 9 according to FIG. 2 terminates below the upper end of the valve housing 3. The internal thread 36 of the valve housing 3 ends below the upper end of the valve housing 3.

In an exemplary embodiment, the valve cage 5 is an essentially hollow cylindrical body with an outer diameter which is dimensioned at least in sections corresponding to the inner diameter of the valve cage 3. The outer contour of the valve cage 5 can be stepped or contoured axially in sections.

In the front side contact region 63 between valve cage 5 and valve housing 3, an exemplary guiding surface 67 is provided as shown in FIG. 2, which has the largest outer diameter of the valve cage 5. The guiding surface 67 is complementary in shape to a section of the inner side 41 of the valve housing 3 arranged correspondingly in the front side contact region 63. In an exemplary embodiment, the front side contact region 63 also includes a securing surface 64 in which the securing device is provided between valve cage 5 and valve housing 3. The securing device may also be referred to as a securing mechanism, securing lock, securing pin, position lock, rotation lock, lock, pin, or the like. The front-side contact region 63 further comprises a sealing surface 65 in the region of the front-side sealing 11. The sealing surface 65 is arranged on the inner side 41 of the valve housing 3 in accordance with the position of the seal receiver 55 in the mounted state of the valve cage 5. The sealing surface 65 is arranged in the axial direction above the guiding surface 67. In the axial direction A below the guiding surface 67, the securing surface 64 is formed on the inner side 41 of the valve housing 3.

In an exemplary embodiment as illustrated in FIG. 2, the securing surface 64 on the inner side 41 of the valve housing 3 can be realized by two longitudinal grooves 43 extending in the axial direction A, which is introduced into the valve housing 3 in the front-side contact region 63. The longitudinal groove 43 is opened upwards in the axial direction so that the securing device provided on the outer side 53 of the valve cage 5 can be inserted from above into the valve housing 3 in the longitudinal groove 43 when inserting the valve cage 5. In an exemplary embodiment, the securing device on the valve cage 5 is realized in FIG. 2 with pin 71 protruding outwards in radial direction R. The pin 71 forms a rotation lock 7. In the valve cage 5, a blind borehole 73 is drilled for each pin 71, into which the pin 71 is inserted, particularly by forming a press fit. When the valve cage 5 is inserted into the valve housing 3 with at least one, for example, two pins 71 inserted, so that the pins, which form radial projections with respect to the outer side 53 of the valve cage 5, engage form complementary in the radial recesses which are formed as longitudinal grooves 43 of the inner side 41 of the valve housing 3, a rotation lock is realized, which allows only a predetermined rotational position with respect to the axial direction A of the valve cage 5 relative to the valve housing 3. In an exemplary embodiment, the securing device realized by the radial projections on the outer side 53 of the valve cage 5 and the radial recesses on the inner side 41 of the valve housing 3 is configured by a sliding fit or a clearance fit such that a relative movement of the valve cage 5 relative to the valve housing 3 is practically excluded in the mounting position (after completion of mounting), wherein it should be clear that subsidence or relaxation phenomena may occur. The securing device between the outer side 53 of the valve cage 5 and the inner side 41 of the valve housing 3 ensures, in particular, that no torsional deformation and no rotational movement of the valve cage 5 occur when the fastening nut 9 is screwed into the valve housing 3 even with high axial clamping forces and consequent friction torsion thereof between the fastening nut 9 and the valve cage 5 (even if no intermediate sleeve 8 were provided between the fastening nut 9 and the valve cage 5).

In an exemplary embodiment of a valve cage arrangement 1 as shown in FIG. 2, an intermediate sleeve 8 is arranged in the axial direction A between the lower (foot) surface of the fastening nut 9 and the valve cage 5. The intermediate sleeve 8 is held against rotation relative to the valve cage 5 by means of a linear guide 81. The linear guide 81 allows only a linear movement of the intermediate sleeve 8 in the axial direction A relative to the valve cage 5. The linear guide 81 is realized as shown in FIG. 2 exemplary by a dowel pin, which engages in each of one matching receiver of the valve cage 5 and the intermediate sleeve 8.

In the axial direction A between the intermediate sleeve 8 and the valve cage 5 and in the radial direction R between the valve cage 5 and the valve housing 3, a sealing receiver 55 is formed, in which the annular sealing 11 is seated. The annular sealing 11 has a parallelogram-shaped cross-section. It is also conceivable that the annular sealing 11 has another, for example, round, triangular, square or rectangular cross section or the like.

The clamping force introduced by the fastening nut 9 in the axial direction A into the intermediate sleeve 8 is transmitted at least partially from the intermediate sleeve 8 to the sealing 11. A cone-shaped contact surface between the annular sealing 11 and the valve cage 5 assists in converting the axial clamping forces from the fastening nut 9 into radial clamping and/or deformation forces acting in particular on the sealing 11. The sealing 11 is clamped between the intermediate sleeve 8 and the valve cage 5 during clamping of the valve cage 5. The axial clamping of the sealing 11 causes a radial deformation of the sealing 11, which may be elastic to cause a radial compression between the sealing 11 and the valve cage inner side 41 and so to achieve a particularly good sealing effect.

Thanks to the linear guide of the intermediate sleeve 8 relative to the valve cage 5 a purely axial movement of the intermediate sleeve 8 takes place during pressing and thus a purely axial influence of the sealing 11 through the intermediate sleeve 8. The action of the intermediate sleeve 8 on the sealing 11 is almost or completely free of torsional elements. In particular, if the sealing 11 is designed as a graphite sealing or the like, the purely axial compression without torsional forces for a damage-free use of the sealing 11 is relevant.

FIG. 3 shows in detail the sealing 11 and the intermediate sleeve 8 arranged between the fastening nut 9 and the valve cage 5 according to an exemplary embodiment. The intermediate sleeve 8 is provided with an internal thread 84 for mounting on the valve cage 5. The valve cage 5 has at its front side end axial end 54 an external thread which is formed complementary to the internal thread 84 of the intermediate sleeve 8. In the axial direction A, the internal thread 84 and the external thread 56 are about the same length. In the mounting state shown in FIGS. 1-3, the intermediate sleeve 8 is screwed in the axial direction A beyond the internal thread 84 on the valve cage. Internal threads 84 and external threads 56 are arranged in the axial direction A completely offset from each other with a small axial distance. Thus, the intermediate sleeve 8 is secured by the thread pairing against losing, at the same time an axial relative mobility of the intermediate sleeve 8 is provided relative to the valve cage 5 in the final mounting state. The intermediate sleeve 8 is linearly movable, so purely axially movable, held on the valve cage 5 by means of the linear bearing 81, which may be realized for example by one, two or more pins.

The features disclosed in the foregoing description, the Figures and the claims may be of importance both individually and in any combination for the realization of the disclosure in a variety of configurations.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 Arrangement
2 Globe valve
3 Valve housing
5 Valve cage
7 Rotation lock
8 Intermediate sleeve
9 Fastening nut
11, 12 Sealing
20 Actuating drive
21 Reciprocating piston
23 Actuating rod
25 Valve seat
31 Inlet
33 Outlet
34 Cover
35 Passage opening
36 Internal thread
37 Actuating opening
38 Annular section
39 Extension
41 Inner side
43 Longitudinal nut
51 Passage channel
52 Valve cage-foot section
53 Outer side
54 Valve cage-face portion
55 Sealing receiver
56 External thread
61, 63 Contact area
64 Securing surface
65 Sealing surface
67 Guiding surface
71 Pin
73 Blind borehole
81 Linear guide
84 Internal thread
91 External thread
A Axial direction

The invention claimed is:

1. An arrangement for a globe valve for adjusting a process fluid, the arrangement comprising:
a valve housing including an inlet and an outlet for the process fluid, a passage opening that is arranged between the inlet and the outlet, and an internal thread;
a fastening nut with an external thread configured to screw into the internal thread;
a valve cage configured to linearly guide a valve member of the globe valve in an axial direction, and including at least one passage channel for the process fluid which extends transversely in the axial direction, wherein the valve cage is arranged in the valve housing such that: the valve cage circumferentially surrounds the passage opening with respect to the axial direction, the valve cage is clampable in the axial direction between the fastening nut and an annular section surrounding the passage opening of the valve housing, and a radial outer side of the valve cage with respect to the axial direction is in contact with a radial inner side of the valve housing with respect to the axial direction;
an intermediate sleeve arranged between the fastening nut and the valve cage such that an axial clamping force with which the valve cage is held between the annular section and the fastening nut is transmitted completely indirectly from the fastening nut through the intermediate sleeve to the valve cage;
a sealing arranged radially between the valve cage and the valve housing, the sealing being received in a sealing receiver delimited in the axial direction by the intermediate sleeve and by the valve cage; and
a position lock configured to fix a relative position of the valve cage relative to the valve housing and arranged on the radial outer side and/or on the radial inner side.

2. The arrangement according to claim 1, wherein the position lock is a rotation lock configured to prevent a rotational movement of the valve cage relative to the valve housing, the rotation lock including a connection which is form-fit relative to the axial direction in a circumferential direction.

3. The arrangement according to claim 2, wherein the position lock comprises:
at least one radial projection on the radial outer side of the valve cage and at least one radial recess on the radial inner side of the valve housing; or
at least one radial recess on the radial outer side of the valve cage and at least one radial projection on the radial inner side of the valve housing.

4. The arrangement according to claim 1, wherein the position lock comprises:
- at least one radial projection on the radial outer side of the valve cage and at least one radial recess on the radial inner side of the valve housing; or
- at least one radial recess on the radial outer side of the valve cage and at least one radial projection on the radial inner side of the valve housing.

5. The arrangement according to claim 4, wherein the at least one radial projection is integrally formed by material of the valve cage or the valve housing.

6. The arrangement according to claim 4, wherein the at least one radial projection is a connecting body.

7. The arrangement according to claim 6, wherein the connecting body is a pin or a wedge.

8. The arrangement according to claim 6, wherein the at least one radial recess comprises a blind borehole configured to hold the connecting body or a groove extending in the axial direction.

9. The arrangement according to claim 1, wherein the intermediate sleeve is held with a linear guide relative to the valve housing and/or relative to the valve cage, the linear guide being configured to permit a translational relative movement in the axial direction and prevent a rotational relative movement.

10. The arrangement according to claim 1, wherein the valve cage is sleeve shaped.

11. The arrangement according to claim 1, wherein the valve member is a reciprocating piston.

12. The arrangement according to claim 1, wherein the arrangement is configured to adjust the process fluid of a technical process plant, a chemical plant, a food processing plant, or a power plant.

13. A globe valve configured to adjust a process fluid, comprising:
an arrangement including:
- a valve housing including an inlet and an outlet for the process fluid, a passage opening that is arranged between the inlet and the outlet, and an internal thread;
- a fastening nut with an external thread configured to screw into the internal thread;
- a valve cage configured to linearly guide a valve member of the globe valve in an axial direction, and including at least one passage channel for the process fluid which extends transversely in the axial direction, wherein the valve cage is arranged in the valve housing such that: the valve cage circumferentially surrounds the passage opening with respect to the axial direction, the valve cage is clampable in the axial direction between the fastening nut and an annular section surrounding the passage opening of the valve housing, and a radial outer side of the valve cage with respect to the axial direction is in contact with a radial inner side of the valve housing with respect to the axial direction;
- an intermediate sleeve arranged between the fastening nut and the valve cage such that an axial clamping force with which the valve cage is held between the annular section and the fastening nut is transmitted completely indirectly from the fastening nut through the intermediate sleeve to the valve cage;
- a sealing arranged radially between the valve cage and the valve housing, the sealing being received in a sealing receiver delimited in the axial direction by the intermediate sleeve and by the valve cage; and
- a position lock configured to fix a relative position of the valve cage relative to the valve housing and arranged on the radial outer side and/or on the radial inner side;

a valve member that is linearly movably guided in the valve cage;
an actuator connected to the valve member and configured to actuate the valve member; and
a housing cover with an actuating opening for the actuator.

14. The globe according to claim 13, wherein the actuator is an actuating rod.

15. The globe according to claim 13, wherein the valve member is a reciprocating piston.

16. An arrangement for a globe valve for adjusting a process fluid, the arrangement comprising:
- a valve housing including an inlet and an outlet for the process fluid, a passage opening that is arranged between the inlet and the outlet, and an internal thread;
- a fastening nut with an external thread configured to screw into the internal thread;
- a valve cage configured to linearly guide a valve member of the globe valve in an axial direction, and including at least one passage channel for the process fluid which extends transversely in the axial direction, wherein the valve cage is arranged in the valve housing such that: the valve cage circumferentially surrounds the passage opening with respect to the axial direction, the valve cage is clampable in the axial direction between the fastening nut and an annular section surrounding the passage opening of the valve housing, and a radial outer side of the valve cage with respect to the axial direction is in contact with a radial inner side of the valve housing with respect to the axial direction;
- an intermediate sleeve arranged between the fastening nut and the valve cage such that an axial clamping force with which the valve cage is held between the annular section and the fastening nut is transmitted completely indirectly from the fastening nut through the intermediate sleeve to the valve cage, wherein the intermediate sleeve is held with a linear guide relative to the valve housing and/or relative to the valve cage, the linear guide being configured to permit a translational relative movement in the axial direction and prevent a rotational relative movement; and
- a position lock configured to fix a relative position of the valve cage relative to the valve housing and arranged on the radial outer side and/or on the radial inner side.

17. A globe valve configured to adjust a process fluid, comprising:
an arrangement according to claim 16;
a valve member that is linearly movably guided in the valve cage;
an actuator connected to the valve member and configured to actuate the valve member; and
a housing cover with an actuating opening for the actuator.

* * * * *